US009769441B2

(12) United States Patent
Hsiao et al.

(10) Patent No.: US 9,769,441 B2
(45) Date of Patent: Sep. 19, 2017

(54) ELECTRONIC DEVICE AND METHOD FOR ADJUSTING SETTING FOR PROJECTING SCREEN BY RE-CALCULATING AMBIENT CONTRAST RATIO ACCORDING TO VARIATION OF AMBIENT LIGHT

(71) Applicant: Acer Incorporated, New Taipei (TW)

(72) Inventors: Ya-Chih Hsiao, New Taipei (TW); Jun-Liang Lu, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 14/740,273

(22) Filed: Jun. 16, 2015

(65) Prior Publication Data

US 2016/0100140 A1  Apr. 7, 2016

(30) Foreign Application Priority Data

Oct. 3, 2014  (TW) .............................. 103134557 A

(51) Int. Cl.
*H04N 9/31* (2006.01)
*G01J 1/42* (2006.01)

(52) U.S. Cl.
CPC .......... *H04N 9/3179* (2013.01); *G01J 1/4204* (2013.01); *H04N 9/3182* (2013.01); *H04N 9/3194* (2013.01)

(58) Field of Classification Search
CPC ... H04N 9/3194; H04N 9/3182; H04N 9/3179
See application file for complete search history.

(56) References Cited

U.S. PATENT DOCUMENTS

| 5,597,223 A * | 1/1997 | Watanabe | .......... G02B 26/0833 |
| | | | 349/61 |
| 6,927,784 B2 * | 8/2005 | Matsuda | .................. G09G 5/10 |
| | | | 345/690 |
| 6,939,011 B2 * | 9/2005 | Kobayashi | ............... H04N 5/74 |
| | | | 348/E5.137 |
| 7,090,356 B2 * | 8/2006 | Koide | .................. H04N 9/3138 |
| | | | 348/801 |

(Continued)

FOREIGN PATENT DOCUMENTS

| CN | 102012615 | 4/2011 |
| CN | 102025893 | 4/2011 |

*Primary Examiner* — Bao-Luan Le
(74) *Attorney, Agent, or Firm* — Jianq Chyun IP Office

(57) ABSTRACT

An electronic device including a projection unit, an ambient light sensor and a processing unit is provided. The projection unit has a projection lens fixed on a side surface of the electronic device. The ambient light sensor is fixed on the side surface of the electronic device. The processing unit is configured to: control an average brightness of a screen projected by the projection unit as a first brightness value, and control the ambient light sensor to sense to derive a first measured brightness value; control an average brightness of the screen projected by the projection unit as a second brightness value, and control the ambient light sensor to sense to derive a second measured brightness value; calculate an ambient contrast ratio according to the first measured brightness value and the second measured brightness value; and adjust a projecting setting of the projection unit according to the ambient contrast ratio.

8 Claims, 4 Drawing Sheets

(56) References Cited

U.S. PATENT DOCUMENTS

| | | | | |
|---|---|---|---|---|
| 7,140,736 B2 * | 11/2006 | Kobayashi | H04N 5/74 | 348/E5.137 |
| 7,542,055 B2 * | 6/2009 | Matsuda | G09G 1/285 | 345/690 |
| 7,631,974 B2 * | 12/2009 | Mukai | G09G 3/20 | 345/589 |
| 7,959,300 B2 * | 6/2011 | Hirahara | H04N 5/74 | 345/156 |
| 8,130,184 B2 * | 3/2012 | Garner | H04N 5/58 | 345/207 |
| 8,382,289 B2 * | 2/2013 | Hikosaka | H04N 9/31 | 348/744 |
| 8,523,369 B2 * | 9/2013 | Lee | G03B 21/00 | 353/121 |
| 8,534,843 B2 * | 9/2013 | Yamamura | H04N 9/31 | 345/589 |
| 8,870,393 B2 * | 10/2014 | Kawahara | H04N 9/3182 | 345/589 |
| 2003/0147053 A1 * | 8/2003 | Matsuda | G09G 1/285 | 353/31 |
| 2004/0021831 A1 * | 2/2004 | Koide | H04N 9/3138 | 353/31 |
| 2004/0239888 A1 * | 12/2004 | Kobayashi | H04N 5/74 | 353/69 |
| 2005/0243286 A1 * | 11/2005 | Kobayashi | H04N 5/74 | 353/69 |
| 2007/0046908 A1 * | 3/2007 | Choi | G03B 9/04 | 353/121 |
| 2009/0207383 A1 * | 8/2009 | Hirahara | H04N 5/74 | 353/69 |
| 2009/0256974 A1 * | 10/2009 | Mukai | G09G 3/20 | 348/751 |
| 2010/0265403 A1 * | 10/2010 | Hikosaka | H04N 9/31 | 348/607 |
| 2010/0315825 A1 | 12/2010 | Kawamura | | |
| 2011/0051100 A1 * | 3/2011 | Lee | G03B 21/00 | 353/85 |
| 2012/0019687 A1 | 1/2012 | Razavi et al. | | |

* cited by examiner

ELECTRONIC DEVICE AND METHOD FOR ADJUSTING SETTING FOR PROJECTING SCREEN BY RE-CALCULATING AMBIENT CONTRAST RATIO ACCORDING TO VARIATION OF AMBIENT LIGHT

CROSS-REFERENCE TO RELATED APPLICATION

This application claims the priority benefit of Taiwan application serial no. 103134557, filed on Oct. 3, 2014. The entirety of the above-mentioned patent application is hereby incorporated by reference herein and made a part of this specification.

BACKGROUND OF THE INVENTION

Field of the Invention

The invention relates to an electronic device, and particularly to an electronic device and a method for adjustment of a projecting screen of an electronic device.

Description of Related Art

Projection apparatuses are being widely used often in a meeting room, in a classroom or at home nowadays. When a projector is used for display purposes, a dark environment is required for clear presentation. However, creating such dark environment is inconvenient in various respects. One main reason is that a conventional screen for projection is a flat surface good in light scattering since the screen projects light from all sources outward in all directions, no matter the light is from the projector or other illumination light sources or ambient light sources. Thus, to aim for a clear projected screen, it is necessary to control the light sources other than the projector. Projectors on the market are classified into LCD projectors and DLP projectors. An LCD projector uses three liquid-crystal panels respectively as imaging elements of three primary colors including red, green and blue. After the light from a light source is converted into monochromatic lights by a color separation unit, the monochromatic lights then reach their corresponding liquid-crystal panels, and the three liquid-crystal panels control brightness of light passed according to colors of pixel points. Finally, the light passes through a light-focusing unit to be projected to the screen and the lights from the three liquid-crystal panels converge to form a pixel point. A DLP projector has only one DMD imaging member. The light from a light source undergoes color separation by a color wheel and then reaches the DMD in a time-division manner. Rotation of an upper micromirror of the DMD is controlled according to colors of pixel points. The lights of three colors reach the screen in a time-division manner and the screen is formed thereby. Though the DLP projector has better contrast presentation, the DLP projector does not always achieve a high contrast ratio under the influence of an ambient light source. In order to improve projection quality, a user may manually make adjustments by using brightness and contrast options in the projector. Nonetheless, such method causes more inconvenience to the user.

SUMMARY OF THE INVENTION

The invention provides an electronic device and a method for adjustment of a projecting screen, by which an influence of ambient light on a screen projected by the electronic device is reduced.

The electronic device of the invention includes a projection unit, an ambient light sensor and a processing unit. The projection unit has a projection lens fixed on a side surface of the electronic device, and projects a screen through the projection lens. The ambient light sensor is fixed on the side surface of the electronic device. The processing unit is coupled to the projection unit and the ambient light sensor, and is configured to: control an average brightness of the screen projected by the projection unit as a first brightness value, and control the ambient light sensor to sense to derive a first measured brightness value; control the average brightness of the screen projected by the projection unit as a second brightness value, and control the ambient light sensor to sense to derive a second measured brightness value, wherein a difference between the first brightness value and the second brightness value is bigger than a first threshold; calculate an ambient contrast ratio according to the first measured brightness value and the second measured brightness value; and adjust a projecting setting of the projection unit according to the ambient contrast ratio.

The method for adjustment of a projecting screen of the invention is adapted for an electronic device having a projection unit. The method includes the following steps. First, controlling an average brightness of a screen projected by the projection unit as a first brightness value, and sensing is performed to derive a first measured brightness value. Then, controlling the average brightness of the screen projected by the projection unit as a second brightness value, and sensing is performed to derive a second measured brightness value, wherein a difference between the first brightness value and the second brightness value is bigger than a first threshold. Next, an ambient contrast ratio is calculated according to the first measured brightness value and the second measured brightness value. Also, a projecting setting of the projection unit is adjusted according to the ambient contrast ratio.

Based on the above, the invention provides an electronic device and a method for adjustment of a projecting screen, wherein the current brightness of the ambient environment and the ambient contrast ratio are derived so as to accordingly adjust the projecting setting of the projection unit.

To make the above features and advantages of the invention more comprehensible, embodiments accompanied with drawings are described in detail as follows.

DESCRIPTION OF DISCLOSED EMBODIMENTS

Currently, there are projection apparatuses equipped with an ambient light sensor, wherein quality of an output image is adjusted by sensing by the ambient light sensor. The ambient light sensor may be disposed at an upper end or front end of a projector. However, in some use scenarios, the projector is mounted and fixed on a ceiling in an inverted manner. Here, if the ambient light sensor is disposed at the upper end of the projector, the ambient light sensor cannot measure correct brightness of an ambient light source due to the inverted arrangement of the projector. In some use scenarios, the ambient light sensor disposed at the front end of the projector may encounter a similar problem for being too distant from a screen for projection. In addition, the ambient light sensor may receive light that has been projected from the projector itself and reflected back to the projector by the screen, and thus the ambient light sensor cannot correctly measure the brightness of the ambient light source.

The invention uses the ambient light sensor attached to the front end of the projector to directly calculate and derive brightness of a light source around the projection apparatus according to a brightness value of the light reflected from the screen. Moreover, a projecting setting such gamma, color saturation, etc. output by the projection apparatus is adjusted according to the measured brightness. In addition, in the invention, by analyzing the image content of a projecting screen, intensity of the light projected from the projector and reflected to the ambient light sensor on the projector by the screen is estimated, thus eliminating error in measuring the ambient light source. As a result, better quality of a projected image is achieved without making a change to the ambient light source. Hereinafter, technical features of the invention are explained in detail with reference to embodiments and drawings.

Figure 1:
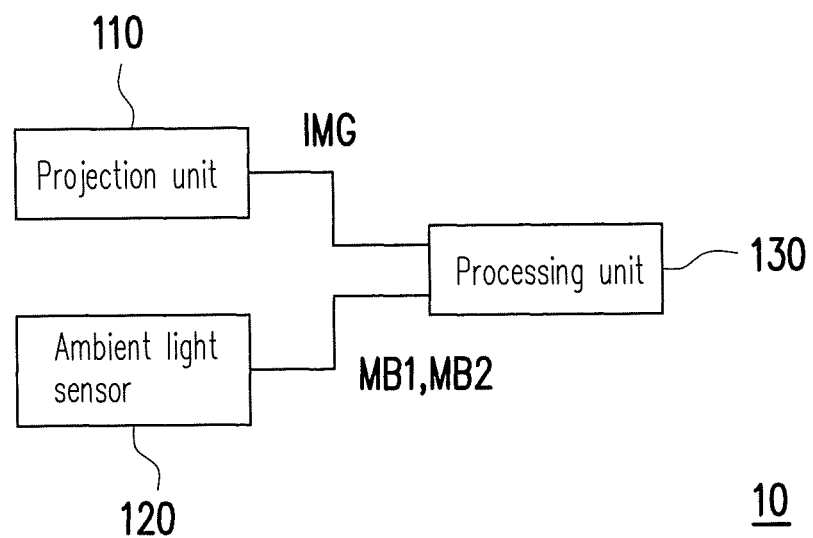
FIG. 1 is a block view illustrating an electronic device according to an embodiment of the invention.

FIG. 1 is a block view illustrating an electronic device according to an embodiment of the invention. Referring to FIG. 1, an electronic device 10 includes a projection unit 110, an ambient light sensor 120 and a processing unit 130. The projection unit 110 has a projection lens fixed on a side surface of the electronic device 10, and projects a screen IMG through the projection lens. The ambient light sensor 120 is fixed on the side surface of the electronic device 10, i.e., on the same side surface as the projection lens.

The processing unit 130 is coupled to the projection unit 110 and the ambient light sensor 120, and is configured to: control the projection unit 110 to project the screen IMG with an average brightness of a first brightness value, and control the ambient light sensor 120 to sense to derive a first measured brightness value MB1; control the projection unit 110 to project the screen IMG with the average brightness of a second brightness value, and control the ambient light sensor 120 to sense to derive a second measured brightness value MB2, wherein a difference between the first brightness value and the second brightness value is bigger than a first threshold; calculate an ambient contrast ratio (ACR) according to the first measured brightness value MB1 and the second measured brightness value MB2; and adjust a projecting setting of the projection unit 110 according to the ambient contrast ratio.

Figure 2:
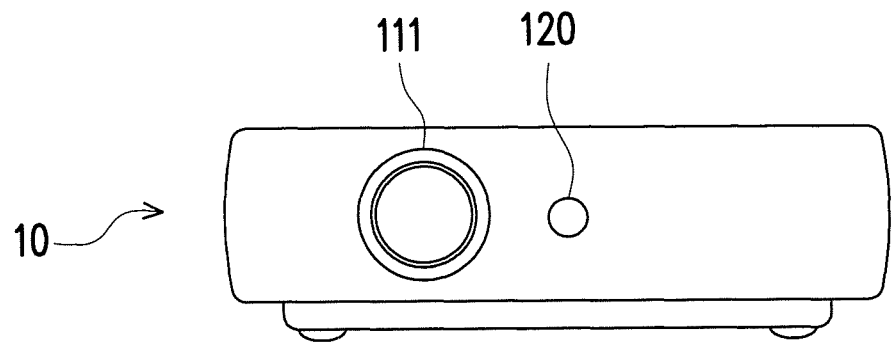
FIG. 2 is a schematic front view illustrating an electronic device according to an embodiment of the invention.

FIG. 2 is a schematic front view illustrating the electronic device 10 according to an embodiment of the invention. In the present embodiment, the electronic device 10 is a projector. However, in practice, the electronic device may also be a smartphone or notebook computer that has a projection unit, or any other electronic device that has a projection unit. The invention is not limited to the above. As shown in FIG. 2, the ambient light sensor 120 is disposed on the same side of the electronic device 10 as a projection lens 111 of the projection unit 110. In this way, the ambient light sensor 120 may be used to sense and measure a brightness value of the light that has been projected from the projection lens 111 and reflected by a light-reflecting object (e.g., a screen or a wall, etc.) with taking into account an influence of an ambient light source around at that time.

Figure 3:
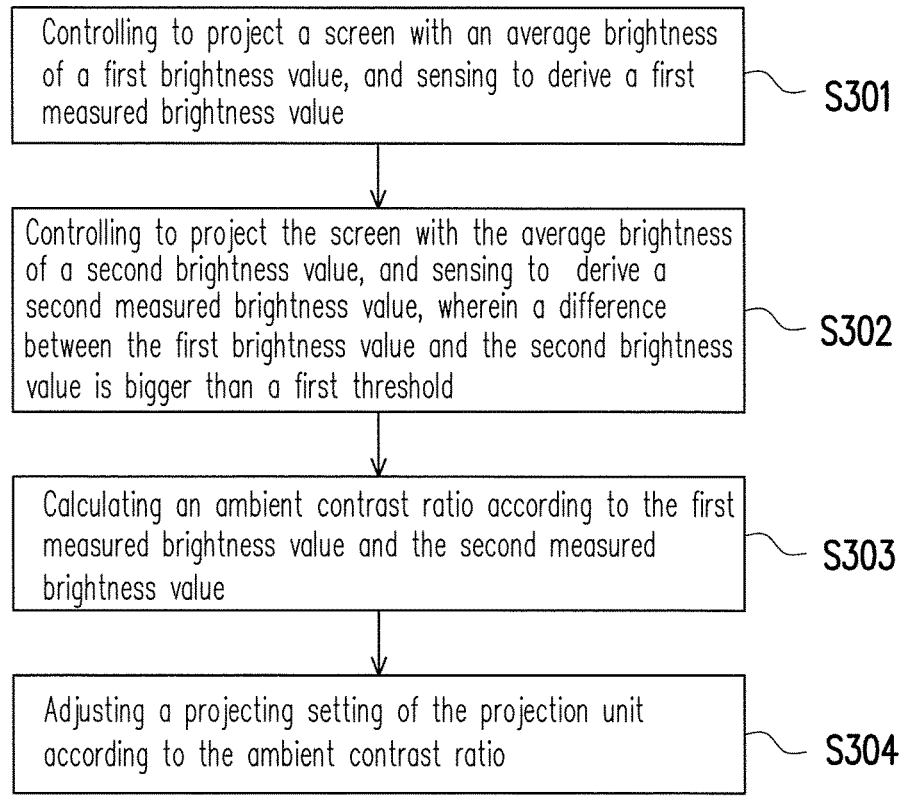
FIG. 3 is a flow chart illustrating a method for adjustment of a projecting screen according to an embodiment of the invention.

FIG. 3 is a flow chart illustrating a method for adjustment of a projecting screen according to an embodiment of the invention. The method for adjustment of a projecting screen is adapted for an electronic device having a projection unit (e.g., the electronic device 10 in the embodiments shown by FIGS. 1 and 2). Referring to FIG. 3, first, in step S301, controlling an average brightness of a screen projected by the projecting unit as a first brightness value, and sensing (e.g., through an ambient light sensor) to derive a first measured brightness value. In other words, Step S301 of the method is controlling the projecting unit to project the screen, wherein the average brightness of the screen is controlled to be the first brightness value (i.e., a screen with an average brightness of a first brightness value is projected), and sensing (e.g., through an ambient light sensor) to derive the first measured brightness value. Then, in step S302, controlling the average brightness of the screen projected by the projection unit as a second brightness value, and sensing to derive a second measured brightness value, wherein a difference between the first brightness value and the second brightness value is bigger than a first threshold. Next, in step S303, an ambient contrast ratio is calculated according to the first measured brightness value and the second measured brightness value. Also, in step S304, a projecting setting of the projection unit is adjusted according to the ambient contrast ratio.

In brief, in the invention, the electronic device 10 obtains the ambient contrast ratio through a measurement of the brightness (e.g., the first measured brightness value MB1 and the second measured brightness value MB2) of the ambient light source in advance before projecting an image required by the user (e.g., during start-up of the electronic device 10). For example, when the first brightness value is 0, the screen IMG is a fully black image (i.e., fully black screen), and the second brightness value is an average brightness of a known image, such as a fully white image having a brightness of 255 (i.e., fully white screen), or an image including a trademark of a manufacturer of the electronic device 10 shown by the electronic device 10 during start-up (if the first threshold is set to 128, the average brightness of the image may be set within a range of 128 to 255). However, the invention is not limited thereto.

In such implementation manner, the first measured brightness value may approximate to the current brightness of the ambient light source, and the second measured brightness value may be equal to the summation of the brightness of the ambient light source and a light component reflected by the light-reflecting object which the projected unit 110 is projected to. Accordingly, the processing unit 130 of the electronic device 10 calculates to derive the current brightness of the ambient light source around and the ambient contrast ratio, so as to further adjust a projecting setting of the projection unit 110.

For example, the ambient contrast ratio ACR is expressed by the following equation (1):

$$ACR = \frac{SC(255) + AL}{SC(0) + AL} \qquad (1)$$

In the equation, SC (255) represents a brightness value received by the ambient light sensor 120 when a fully white screen is projected and the brightness of the ambient light source around is not taken into account; SC (0) represents a brightness value received by the ambient light sensor 120 when a fully black screen is projected and the brightness of the ambient light source around is not taken into account; and AL represents the current brightness of the ambient light source. Thus, when a fully black image is projected as the screen IMG (i.e., the first brightness value is equal to 0), the first measured brightness value MB1 received by the ambient light sensor 120 approximates to the ambient light source brightness AL (e.g., the value of SC(0) approximates to 0). When a fully white screen is projected as the screen IMG (i.e., the second brightness value is equal to 255), the second measured brightness value MB2 received by the ambient light sensor 120 is equal to the numerator (SC (255)+AL) in the equation (1). By subtracting the first measured brightness value MB1 from the second measured brightness value MB2, a value of SC(255) is obtained. The obtained value of SC(255) is input into the equation (1) to obtain the ambient contrast ratio ACR.

After the ambient contrast ratio ACR is obtained by calculation, the projecting setting of the projection unit 110 is adjusted according to the ACR. In the invention, the projecting setting includes gamma, saturation and/or contrast ratio, etc. of the projected screen IMG, and not only brightness is adjusted in the projection unit 110 (e.g., power of a lamp in the projection unit 110 is adjusted). In the invention, the processing unit 130 determines what scenario the electronic device 10 is currently in according to the ambient contrast ratio ACR, so as to adjust the above-mentioned projecting setting according to the scenario.

For example, in an embodiment of the invention, the processing unit 130 of the electronic device 10 provides four default scenarios: movie theater scenario, home entertainment scenario, workshop scenario and exhibition scenario, respectively corresponding to scenarios having the ambient contrast ratios ACR greater than 500:1, between 500:1 and 100:1, between 100:1 and 20:1, and smaller than 20:1. According to the above-mentioned four scenarios, the processing unit 130 provides four default projecting settings. When it is determined that one of the four scenarios is encountered currently, the processing unit 130 controls the projection unit 110 to apply the corresponding projecting setting. In the present embodiment, the projecting settings of the above-mentioned four scenarios are as shown in Table 1 below:

TABLE 1

| Ambient contrast ratio | Gamma | Saturation |
| --- | --- | --- |
| Movie theater scenario (ACR > 500:1) | 2.2 | ×1.0 |
| Home entertainment scenario (500:1 > ACR > 100:1) | 2.1 | ×1.05 |
| Workshop scenario (100:1 > ACR > 20:1) | 1.9 | ×1.16 |
| Exhibition scenario (ACR < 20:1) | 1.7 | ×1.30 |

Basically, in a relatively dark scenario (e.g., the movie theater scenario and home entertainment scenario in Table 1), the processing unit 130 sets greater gamma and lower color saturation weight; in a relatively bright scenario (e.g., the workshop scenario and exhibition scenario in Table 1), the processing unit 130 correspondingly sets smaller gamma and higher color saturation weight. However, the projecting settings shown in Table 1 are merely exemplary and the invention is not limited thereto. The user who sets up the electronic device 10 may set up different scenarios and corresponding projecting settings according to actual needs.

In addition, to facilitate understanding, in the present embodiment, the first brightness value is set to 0 and the second brightness value is set to a known value such as 255. However, according to the calculation method proposed in the invention for calculating the ambient contrast ratio, the first and second brightness values do not necessarily have to be the above-mentioned values. The person who sets up the electronic device 10 may adjust the values of the first brightness, the second brightness and the first threshold depending on needs. When the first brightness value and the second brightness value are not equal to the above-mentioned set values of 0 and 255, the ambient contrast ratio ACR may still be calculated and obtained by modifying the above equation (1). The invention is not limited thereto.

In an embodiment of the invention, when the electronic device 10 starts to project the screen IMG required by the user in normal operation, the processing unit 130 still continuously analyzes whether there is any variation of the average brightness of the current screen and reflection brightness (i.e., monitored brightness value) received by the ambient light sensor 120 from the light-reflecting object (which corresponds to the reflection of the projection of the screen). For example, the variation of the average brightness of the screen indicates a difference of the average brightness of the screen within a time period. When the variation is greater than a predetermined value (e.g., when the variation of the monitored brightness value is bigger than a second threshold and/or the variation of the average brightness of the current screen is bigger than a third threshold), the processing unit 130 re-calculates the ambient contrast ratio ACR according to the above-mentioned variation, and determines whether the scenario has changed according to the re-calculated ambient contrast ratio ACR and whether the projecting setting needs to be changed according to the change of the scenario.

Figure 5:
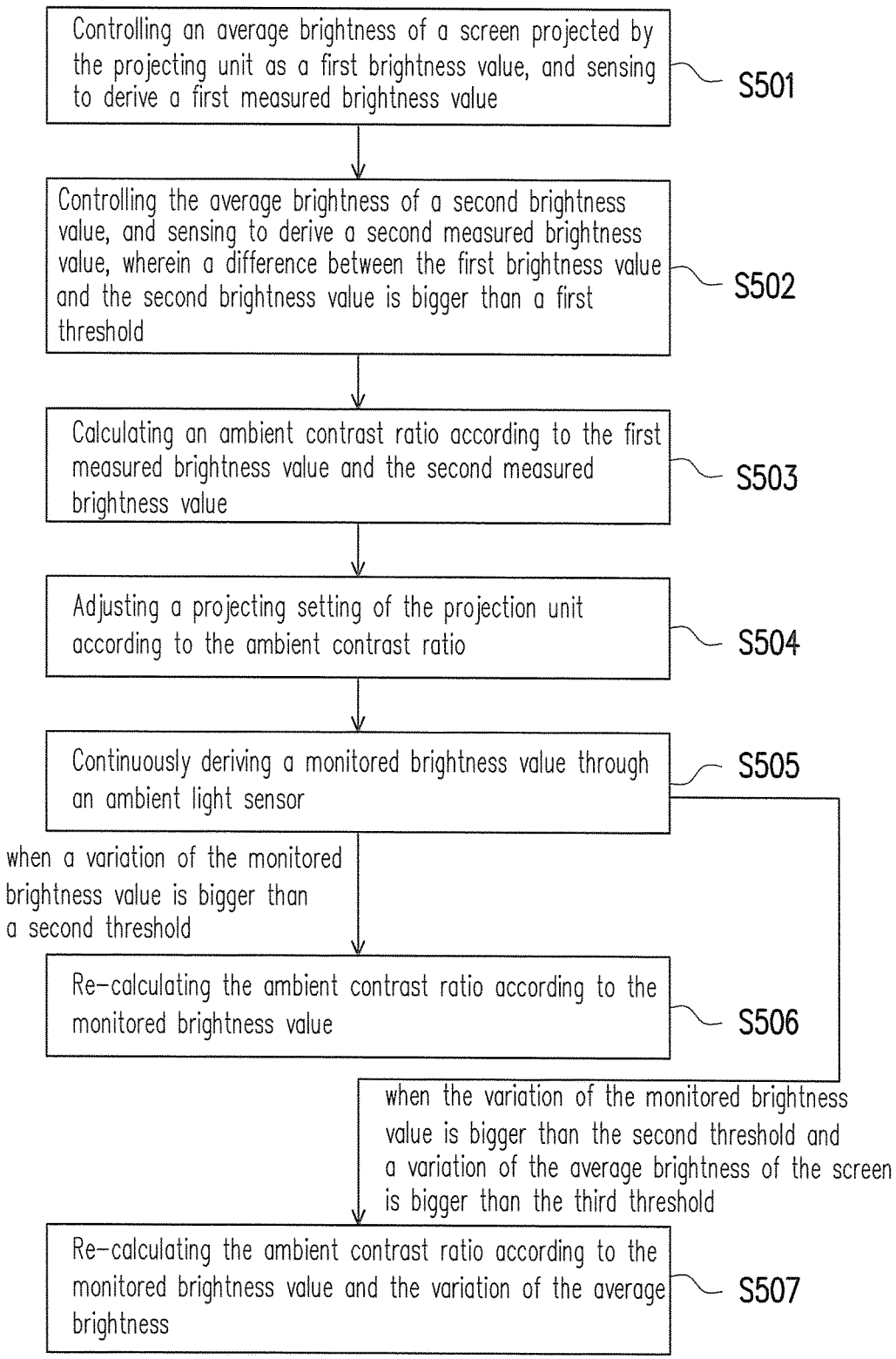
FIG. 5 is a flow chart illustrating a method for adjustment of a projecting screen according to an embodiment of the invention.

FIG. 5 is a flow chart illustrating a method for adjustment of a projecting screen according to an embodiment of the invention. Referring to FIG. 5, steps 501-504 is the same as steps 301-304 in FIG. 3, however, the difference is the embodiment of FIG. 5 may re-calculate the ambient contrast ratio based on different situations. Specifically, in step S505, the processing unit 130 continuously derives a monitored brightness value through the ambient light sensor. And, one situation is when a variation of the monitored brightness value is bigger than a second threshold, in step 506, the processing unit 130 re-calculates the ambient contrast ratio according to the monitored brightness value. For example, in the embodiment of FIG. 5, an exemplary example of calculation of the ambient contrast ratio ACR when the ambient light source brightness AL varies but the average brightness of the screen IMG does not vary is shown below. (e.g., when the variation of the monitored brightness value is bigger than a second threshold) If the current screen IMG is a fully white image, a monitored brightness value SLT sensed by the ambient light sensor 120 is expressed as:

$$SLT = SC(255) + AL \quad (2)$$

When the ambient light source brightness AL varies, the above equation (2) may be rewritten as:

$$SLT' = SC(255) + AL' \quad (3)$$

At this moment, by subtracting the brightness value SC (255) of the fully white screen from the varied monitored brightness value SLT', the varied ambient light source brightness AL' is obtained. The varied ambient contrast ratio ACR' may be expressed as:

$$ACR' = \frac{SC(255) + AL'}{AL'} \quad (4)$$

On the other hand, another situation is when both the variation of the monitored brightness value and the variation of the average brightness of the screen are greater than predetermined values (i.e., the variation of the monitored brightness value is bigger than the second threshold and the variation of the average brightness of the screen is also bigger than the third threshold), in Step 507, the processing unit 130 re-calculates the ambient contrast ratio according to the monitored brightness value and the variation of the average brightness. For example, the processing unit 130 further rewrites the above equation (4) according to the above-mentioned variation of the average brightness of the screen.

Figure 4:
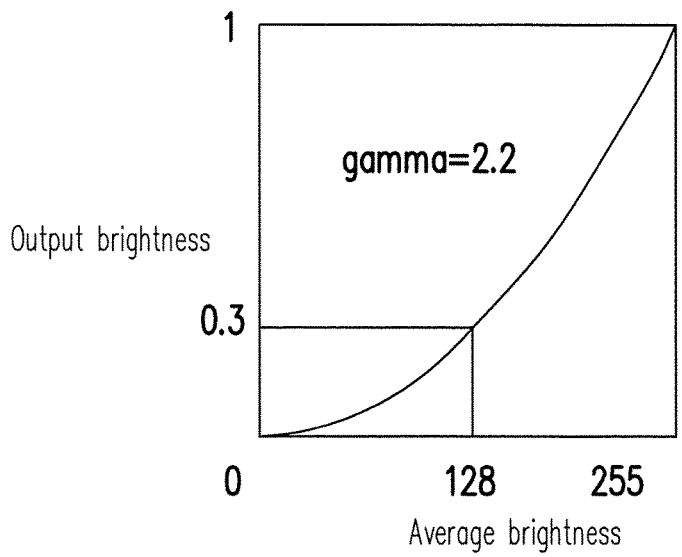
FIG. 4 illustrates a corresponding relationship between output brightness and average brightness when gamma is equal to 2.2 according to an embodiment of the invention.
Figure 6:
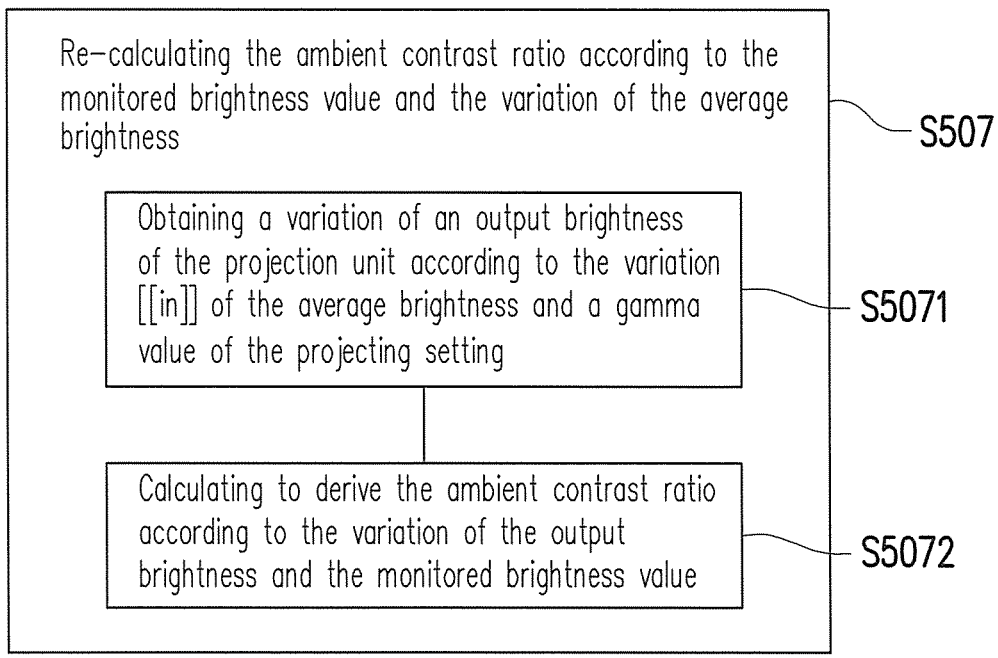
FIG. 6 is a flow chart illustrating a method for adjustment of a projecting screen according to the embodiment of FIG. 5.

FIG. 6 is a flow chart illustrating a method for adjustment of a projecting screen according to the embodiment of FIG. 5. Referring to FIG. 6, in the embodiment, step S507 comprises two steps S5071 and S5072. In step S5071, the processing unit 130 obtains a variation of an output brightness of the projection unit according to the variation of the average brightness and a gamma value of the projecting setting. And then, in step S5072, the processing unit 130 calculates to derive the ambient contrast ratio according to the variation of the output brightness and the monitored brightness value. For example, an exemplary example of calculation of the ambient contrast ratio ACR when both the ambient light source brightness AL and the average brightness of the screen IMG vary is shown below. FIG. 4 illustrates a corresponding relationship between output brightness and average brightness when gamma is equal to 2.2 according to an embodiment of the invention. If an average brightness value of a currently projected screen is 128, the monitored brightness value SLT may be expressed as:

$$SLT = SC(128) + AL \quad (5)$$

In the equation, SC (128) represents a brightness value received by the ambient light sensor 120 when the average brightness of the screen IMG projected by the projection unit 110 is 128. If the current projecting setting of the projection unit 110 defines that the gamma is equal to 2.2, it is known from FIG. 4 that compared to the case where the screen IMG is a fully white image (having a brightness of 255), an output brightness of the screen IMG having the average brightness of 128 is 0.3 times that of the fully white image. Thus, it may be inferred that when the average brightness of the screen IMG projected by the projection unit 110 is 128, the brightness value SC (128) received by the ambient light sensor 120 is also 0.3 times the brightness value SC (255) received by the ambient light sensor 120 when a fully white screen is projected (i.e., SC (128)=0.3*SC (255)).

In this way, when the ambient light source is changed, the monitored brightness value SLT' measured by the ambient light sensor 120 is equal to:

$$SLT' = SC(128) + AL' \quad (6)$$

After the above equation (5) is rewritten by inputting SC (128) and SC (255) thereinto, the varied ambient light source brightness AL' is obtained as:

$$AL' = SLT' - SC(128) = SLT' - SC(255) \times 0.3 \quad (7)$$

Then, the calculation result of the equation (7) is input into the equation (4) to obtain the varied ambient contrast ratio ACR'. Accordingly, the processing unit 130 determines whether the scenario has changed according to the varied ambient contrast ratio ACR' and whether the projecting setting needs to be changed according to the change of the scenario.

In summary, the invention provides an electronic device and a method for adjustment of a projecting screen, wherein the ambient light sensor attached to the front end of the projector is used to directly calculate and derive the brightness of the light source around the projection apparatus according to the brightness value of the light reflected from the light-reflecting object. Moreover, the projecting setting such as gamma or color saturation, etc. of the electronic device is adjusted according to the measured brightness. In addition, in the invention, the electronic device further continuously monitors the average brightness of the current projecting screen and the brightness of the ambient light source around. When either or both of the above vary, the projecting setting of the electronic device is re-adjusted according to the variation, so that in the presence of different ambient light sources, the user is able to clearly see and recognize the projecting screen (e.g., detail of bright regions and detail of dark regions) of the electronic device.

Although the invention has been described with reference to the above embodiments, it will be apparent to persons of ordinary skill in the art that modifications to the described embodiments may be made without departing from the spirit of the invention. Accordingly, the scope of the invention will be defined by the attached claims and not by the above detailed descriptions.

What is claimed is:

1. An electronic device, comprising:
   a projection unit, having a projection lens fixed on a side surface of the electronic device, the projection unit projecting a screen through the projection lens;
   an ambient light sensor, fixed on the side surface of the electronic device; and
   a processing unit, coupled to the projection unit and the ambient light sensor, and configured to:
   control an average brightness of the screen projected by the projection unit as a first brightness value, and control the ambient light sensor to sense to derive a first measured brightness value;
   control the average brightness of the screen projected by the projection unit as a second brightness value, and control the ambient light sensor to sense to derive a second measured brightness value, wherein a difference between the first brightness value and the second brightness value is bigger than a first threshold;
   calculate an ambient contrast ratio according to the first measured brightness value and the second measured brightness value; and
   adjust a projecting setting of the projection unit according to the ambient contrast ratio;
   continuously deriving a monitored brightness value through the ambient light sensor; and
   when a variation of the monitored brightness value is bigger than a second threshold, re-calculating the ambient contrast ratio according to the monitored brightness value;

when the variation of the monitored brightness value is bigger than the second threshold and a variation of the average brightness of the screen is bigger than a third threshold, the processing unit re-calculates the ambient contrast ratio according to the monitored brightness value and the variation of the average brightness.

2. The electronic device of claim 1, wherein:
the processing unit determines a scenario according to the ambient contrast ratio, and adjusts the projecting setting of the projection unit according to the scenario.

3. The electronic device of claim 1, wherein:
the projecting setting of the projection unit comprises gamma, saturation and/or contrast ratio.

4. The electronic device of claim 1, wherein:
the processing unit obtains a variation of an output brightness of the projection unit according to the variation of the average brightness and a gamma value of the projecting setting, and
calculates to derive the ambient contrast ratio according to the variation of the output brightness and the monitored brightness value.

5. A method for adjustment of a projecting screen, adapted for an electronic device having a projection unit, the method comprising:
controlling an average brightness of a screen projected by the projection unit as a first brightness value, and sensing to derive a first measured brightness value;
controlling the average brightness of the screen projected by the projection unit as a second brightness value, and sensing to derive a second measured brightness value, wherein a difference between the first brightness value and the second brightness value is bigger than a first threshold;
calculating an ambient contrast ratio according to the first measured brightness value and the second measured brightness value;
adjusting a projecting setting of the projection unit according to the ambient contrast ratio;
continuously deriving a monitored brightness value through the ambient light sensor;
when a variation of the monitored brightness value is bigger than a second threshold, re-calculating the ambient contrast ratio according to the monitored brightness value; and
when the variation of the monitored brightness value is bigger than the second threshold and a variation of the average brightness of the screen is bigger than a third threshold, re-calculating the ambient contrast ratio according to the monitored brightness value and the variation of the average brightness.

6. The method for adjustment of a projecting screen of claim 5, wherein the step of adjusting the projecting setting of the projection unit according to the ambient contrast ratio comprises:
determining a scenario according to the ambient contrast ratio, and adjusting the projecting setting of the projecting setting of the projection unit according to the scenario.

7. The method for adjustment of a projecting screen of claim 5, wherein:
the projecting setting of the projection unit comprises gamma, saturation and/or contrast ratio.

8. The method for adjustment of a projecting screen of claim 5, wherein the step of re-calculating the ambient contrast ratio according to the monitored brightness value further comprises:
obtaining a variation of an output brightness of the projection unit according to the variation of the average brightness and a gamma value of the projecting setting; and
calculating to derive the ambient contrast ratio according to the variation of the output brightness and the monitored brightness value.

* * * * *